United States Patent [19]

Hashimoto

[11] Patent Number: 4,873,584
[45] Date of Patent: Oct. 10, 1989

[54] COMPUTER CONTROL FOR VCR INCLUDING DISPLAY OF RECORD PLAYBACK LISTING AND PLAYBACK ORDER SELECTION

[75] Inventor: Kazuo Hashimoto, Tokyo, Japan
[73] Assignee: Hashimoto Corporation, Tokyo, Japan
[21] Appl. No.: 215,345
[22] Filed: Jul. 5, 1988
[30] Foreign Application Priority Data

Jul. 3, 1987 [JP] Japan .............................. 62-166432

[51] Int. Cl.$^4$ .............................................. H04N 5/76
[52] U.S. Cl. ................................ 358/335; 358/191.1; 358/903
[58] Field of Search ............ 364/900; 358/335, 191.1, 358/194.1, 903; 360/55, 137

[56] References Cited

U.S. PATENT DOCUMENTS 4,787,063 11/1988 Muguet ............................... 364/900

FOREIGN PATENT DOCUMENTS

59-21114 5/1984 Japan .

Primary Examiner—Robert L. Richardson
Attorney, Agent, or Firm—Lowe, Price, Leblanc, Becker & Shur

[57] ABSTRACT

A VCR control system using a computer, wherein a list of all programs which were recorded in accordance with an individual program table within a predetermined period of time during a user's absence is displayed once on a display. If a user has no time to play back all the recorded programs in the order of the individual program table after he returns to his home, the order of playback can be specified or changed. This makes it possible for the user to watch the programs within a given period of time in the specified order by rewinding or fast forwarding the VCR according to that order.

13 Claims, 7 Drawing Sheets

FIG. 2

TV PROGRAM SCHEDULE OF MONDAY

| HOUR | 10 | | | | 11 | |
|---|---|---|---|---|---|---|
| MINUTE | 0 | 15 | 30 | 45 | 0 | 15 |
| CHANNEL | 1 | 1 | 4 | 6 | 8 | 8 |

FIG. 4

| FUNCTION KEY | F1 | INDIVIDUAL TV PROGRAM SCHEDULE REFERENCE.AMENDMENT |
|---|---|---|
| " | F2 | DISPLAYING TV PROGRAM GUIDES |
| " | F3 | RECEIVING DATA |
| " | F4 | NOT USED |
| " | F5 | VCR CONTROL |

FIG. 5

1... DESIGNATION OF RECORDING IN ABSENT
2... DESIGNATION OF THE ORDER FOR PLAYBACK
3... END (CONTROL OF TV)

FIG.3

```
┌─────────────────────────────────┐
│ TOTAL OF PLAY BACK    → 3 : 15  │
│ TIME                            │
│                                 │
│    ORDER    TIME   CHANNEL  STATUS │
│      1     10:30      4       ●  │
│      2     10:45      5       ○  │
│      )       )        )       )  │
│     10     11:45      4       ○  │
│     11     12:00      1       ×  │
│      )       )        )       )  │
│ PLAY BACK  [ ]                  │
└─────────────────────────────────┘
```

FIG.6

```
┌─────────────────────────────────────┐
│ TOTAL OF PLAY BACK    →  1:30       │
│ TIME                                │
│                                     │
│    ORDER    TIME   CHANNEL   STATUS │
│                                     │
│      1     10:45      6             │
│      2     11:15      8             │
│      3     11:45      4             │
│      4     11:00      6             │
│      )       )        )             │
│      7     10:30      4             │
│                      DESIGNATION OF │
│ PLAY BACK  [▨]       PLAY BACK ORDER  [ ] │
└─────────────────────────────────────┘
```

COMPUTER CONTROL FOR VCR INCLUDING DISPLAY OF RECORD PLAYBACK LISTING AND PLAYBACK ORDER SELECTION

BACKGROUND OF THE INVENTION

The present invention relates to a VCR control system using a computer.

The present applicant has already invented an automatic recording/playback system for TV programs disclosed in Japanese application 61-284121. According to that prior art, the order of playback of recorded programs is specified by programming of the VCR before a user leaves his home. However, therein it is impossible to specify the order of playing back recorded programs after the user returns to his home and has not enough time to play back all the recorded programs.

SUMMARY OF THE INVENTION

It is an object of the present invention to provide a VCR control system using a computer wherein a list of all televisions programs which were recorded in accordance with an individual program table within a predetermined period of time during a user's absence is displayed once on a display. If the user has no time to play back all the recorded programs in the order of the individual program table after he returns to his home, the order of playback can be specified or changed, in accordance with the invention, so that it is possible to watch the programs within a given period of time in the newly specified order by rewinding or fast forwarding the VCR according to that new order.

The above and other objects, features and advantages of the present invention will become more apparent from the following descriptions when taken in conjunction with the accompanying drawings in which a preferred embodiment of the present invention are shown by way of illustrative example.

DESCRIPTION OF THE PREFERRED EMBODIMENT

A detailed description of the preferred embodiment according to the present invention will be now described with reference to the accompanying drawings.

Figure 1:
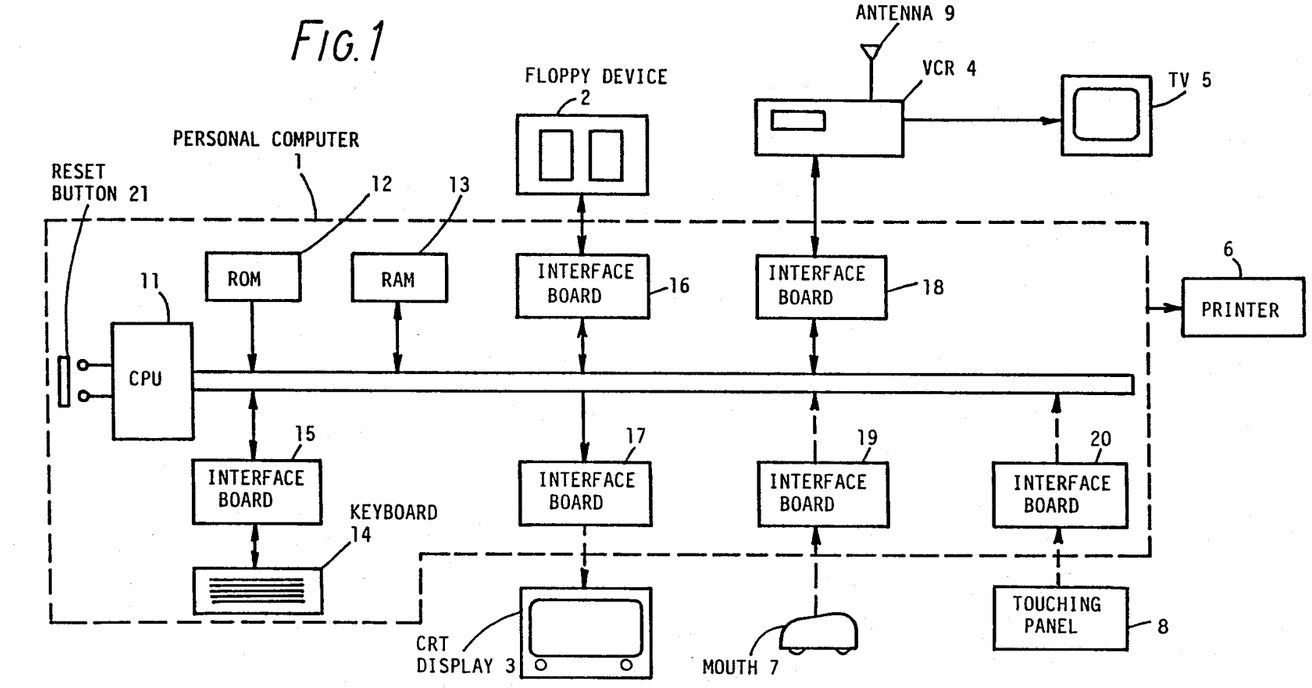
FIG. 1 is a block diagram of a computer controlled VCR system in accordance with the invention.

In FIG. 1, reference numeral 1 denotes a personal computer, e.g., an MSX type computer. In the personal computer 1, reference numeral 11 denotes a microprocessor (cpu: central processing unit), reference numeral 12 denotes a ROM (read only memory) which has prestored therein a program including a boot program for loading computer programming and data stored on a disk to be explained later. Reference numeral 13 is a RAM 9. (random access memory) for storing the data and program. Reference numeral 14 is a keyboard, and reference numeral 15 is an interface board for connecting the keyboard 14 to the cpu 11 through a common bus. Reference numerals 16-20 designate interface boards that connect a floppy device of reference numeral 2, a CRT display of reference numeral 3, a VCR of reference numeral 4, a mouse (to be explained later) of reference numeral 7 or a touch panel (to be explained later) of reference numeral 8 which satisfy a users' request to the personal computer 1.

Reference numeral 5 denotes a TV (television), and reference numeral 6 denotes a printer used for making a hard copy of a TV program schedule, etc., displayed on CRT display 3, to be explained later. Operation of the device shown in FIG. 1 will now be described with reference to FIGS. 2 to 7.

A one week TV program schedule, which is favored by the user, is prestored on a disk (not shown) in the floppy device 2 in FIG. 1 by a process described in Japanese Laid Open No. 284121 (1986).

Figure 2:
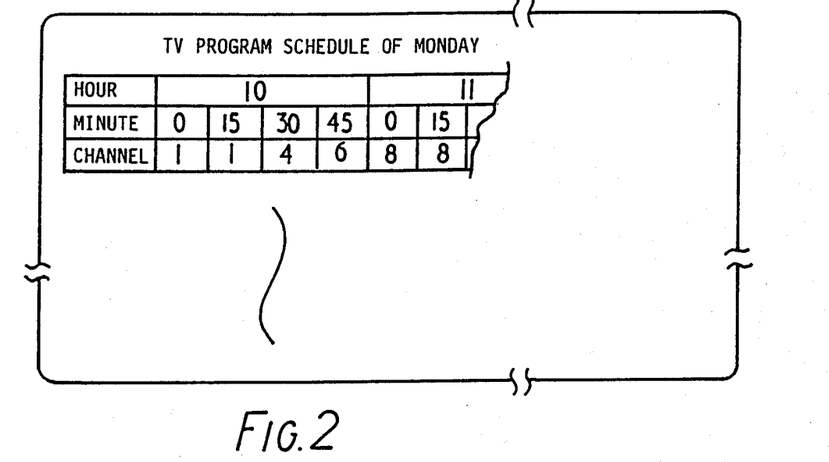
FIG. 2 is a view of a CRT display showing a one week TV program schedule.

FIG. 2 shows a part of an the schedule for Monday displayed on the CRT display as an example, and this display for Monday is designated by a one week TV program schedule stored on the disk. It is clear from FIG. 2 that time schedules are divided in fifteen minute intervals: TV programs on channel 1 are recorded from 10:00 AM to 10:30 AM in the VCR 4, TV programs on channel 4 are recorded from 10:30 AM to 1045 AM in the VCR 4, and TV programs on channel 6 are recorded from 10:45 AM to 11:00 AM in the VCR 4 (the rest is omitted).

Figure 3:
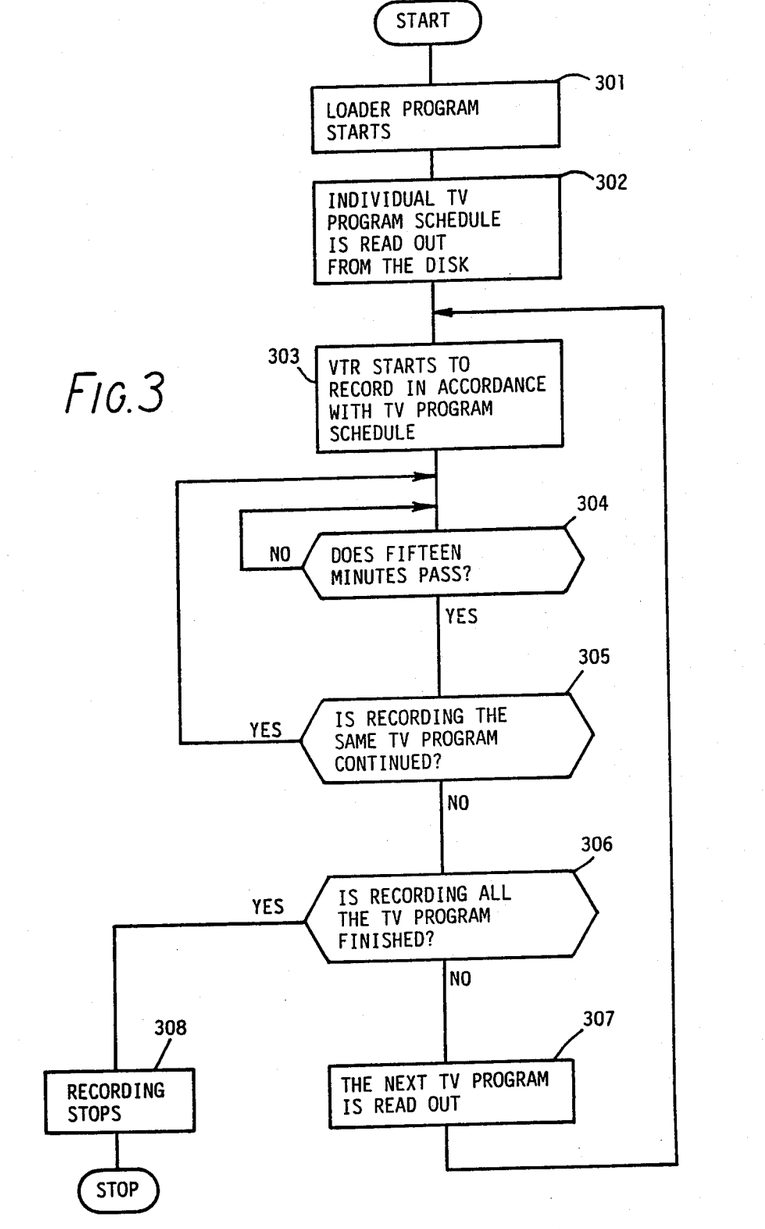
FIG. 3 is a flow chart of a recording operation for TV programs in accordance with a TV program schedule in the VCR.
Figure 4:
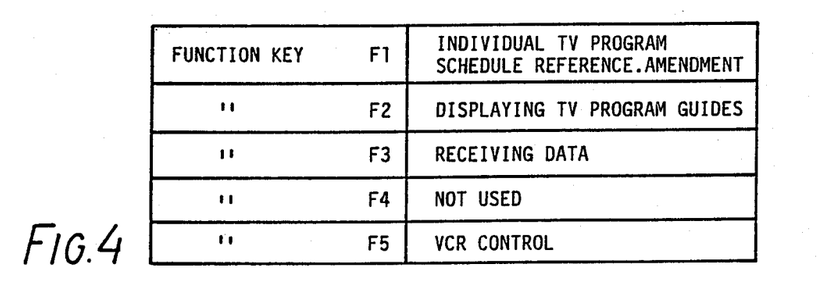
FIG. 4 is a table of function keys and corresponding functions carried out by the invention.

FIG. 3 denotes a flow chart showing a recording operation for recording TV programs in accordance with a TV program schedule in the VCR 4.

When a power source of the personal computer 1 shown in FIG. 1 is set to "ON" or the reset button 21 is operated, the boot program stored in the ROM 12, or the program stored on the disk by similar means, is loaded on the specific part in the RAM 13. A TV program schedule stored on the same disk or a different disk is loaded onto a different part in the RAM 13 by executing the program (step 301 and step 302).

As above, the loaded program compares the time of a real time clock (not shown in the drawings) in the personal computer 1 with the time of TV program schedule loaded as above. When the time of the clock coincides with the time of a desired TV program, the VCR 4 is operated in a recording condition through interface board 18, and starts to record a TV program of the required channel (step 303). When fifteen minutes has passed in step 304, it is checked whether recording of the same program should be continued or not in accordance with the loaded T program schedule (step 305). When recording of the same program is to be continued, the program returns to step 304, and extends only another fifteen minute recording time. However, when recording of a different TV program is started, step 306 checks whether recording of the all TV programs is finished or not. If not, in step 307, the next TV program is read out, and the software program returns to step 303 to switch on recording operation of the VCR for the new program. The starting position and the ending position on the tape in each program are recorded by reading out an output from a tape counter in the VCR 4, not shown in the drawings.

In this embodiment, the interface board 18 to connect the VCR 4 to the microprocessor 11 is made of an integrated circuit (e.g., an 8255 integrated circuit) for parallel input and output, and switching transistors. A switching transistor is set to be "ON" or "OFF" by a command from the personal computer 1 through the interface and a manual switch of the VCR 4, for example, the recording button, the channel button etc., of the VCR.

As above, when the program is loaded from the disk to the RAM 13, various controls can be carried out by the function keys F1, F2, F3, and F4 (each function key has each function shown in FIG. 4) on keyboard 14.

For example, when the function key F1 is pushed, a one week TV program schedule is displayed on the CRT display in order, and the TV program schedule thus displayed can be modified at will.

Figure 5:
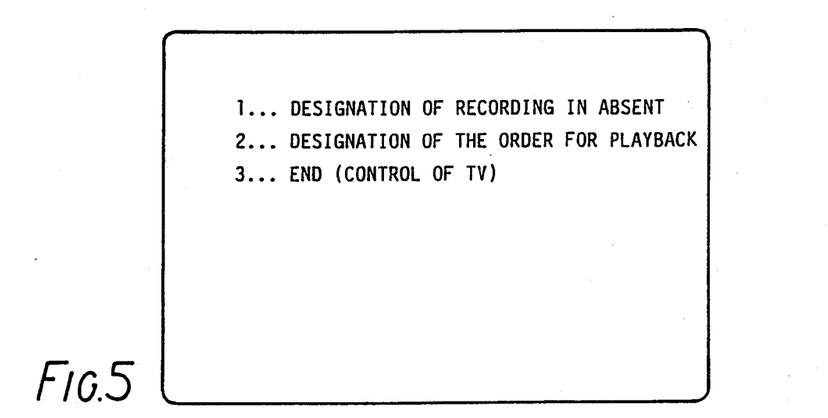
FIG. 5 is a menu displayed on the CRT during operation of the invention.
Figure 6:
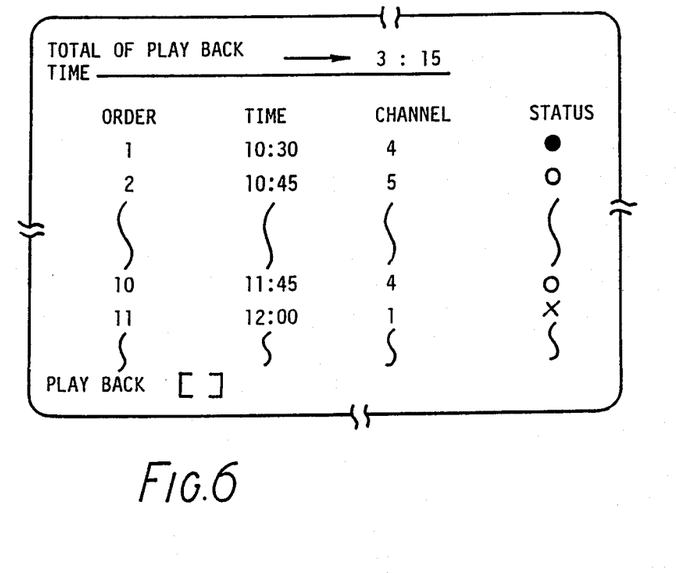
FIG. 6 is a CRT display of a first order of TV recorded programs.

However, it is an objective of this invention to control the VCR when the function key F5 is pushed after a user returns home. The objective of this invention is explained as follows. When the function key F5 is pushed, the sentences shown in FIG. 5 are displayed on the CRT display 3 by an interrupt operation. When the function "2 . . . designation of the order for play back" is selected by the cursor key on the keyboard 14 and the return key is pushed, the . indication shown in FIG. 6 is displayed on the CRT display 3. This is the TV program recorded in accordance with the TV program schedule during an operator's absence.

In FIG. 6, the language "a total of play back time" means the time actually recorded on the video tape, and this time is calculated by the clock (not shown) in the personal computer 1. For example, "3:10" shown in the drawings, which means three hours and ten minutes, is displayed. In watching all the programs recorded on the video tape, it is easy to confirm that it takes three hours and ten minutes to operate.

The times the recorded TV programs, channels and status are displayed on the CRT display, wherein "status" is an indication of the condition of the recording. The reference symbol "o" indicates that the recording of a particular fifteen minute interval is midway. For example, if recording of the first TV program is started from 10:30 AM, however, when recording by the VCR is set to start at 10:35 AM, recording is not done for an entire fifteen minute interval, but is done for only ten minutes. The reference symbol "o" is displayed in the above condition. The reference symbol "o" indicates that recording for fifteen minutes has been done perfectly, and the reference symbol "X" indicates that no recording at all for fifteen minutes has done.

When it is clear to the user that it is difficult to watch all the recorded programs because of lack of time, by the indication of the CRT display shown in FIG. 6, it is possible to designate the preferred order of viewing recorded TV programs by the process to be explained as follows.

A cursor (not shown) is set to the optional order position by the cursor key (except the position of the reference symbol "X", because nothing has been recorded in this position.) The number corresponding to the order is input and the return key is pushed. For example, after the cursor is set to "second order" shown in FIG. 6 and the number "1" is input, when the return key is pushed, "second order" can be changed to "first order" (refer to the FIG. 7 to be explained later).

When the number "0" as the order number is input, recording in this time is not played back (the recording in this time is passed by rewinding or forwarding the tape corresponding to the position of the next record to be played back).

Figure 7:
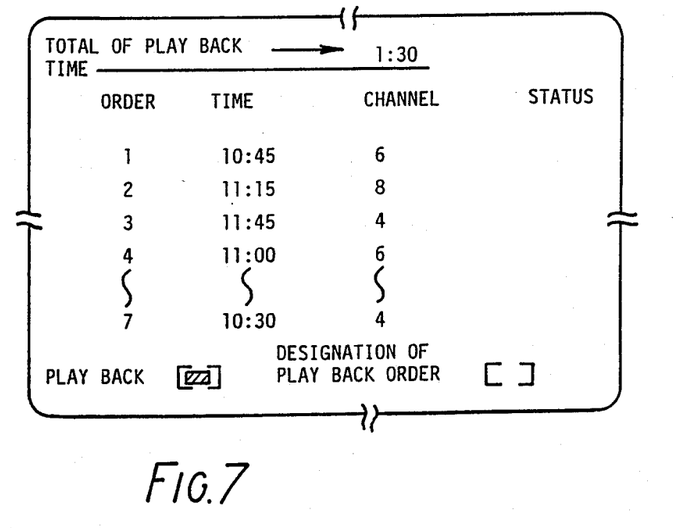
FIG. 7 is a CRT display of a revised order of TV recorded programs in accordance with the invention.

When the requested designation of order is finished, only the return key is pushed. As a result, display on the CRT display 3 is switched, for example, to display of the order which is changed as shown in FIG. 7. Namely, changing from "second order" to "first order" is displayed at the top ( the rest is omitted), "total of time for play back" is changed and the correct time for play back which is changed is displayed.

In order to play back the VCR in accordance with the preferred order changed as above, the cursor is set to "play back [ ]" of the bottom line on the CRT display shown in FIG. 7, and the return key is pushed.

Various data displayed on the CRT display are transmitted to the specific place of the RAM as a data table shown in FIG. 8, and the VCR is controlled in accordance with this data to be explained later.

In FIGS. 6 and 7, the beginning and ending positions (the beginning position and the ending position are read out by the personal computer which reads out the value of a tape counter displayed on the VCR corresponding to the running quantity of the video tape from the physical beginning point of the video tape through the interface board 18) of each program are not shown in the drawings because operation by a user is not directly related to these positions, but these positions are stored with each program in the RAM 13.

Figure 9:
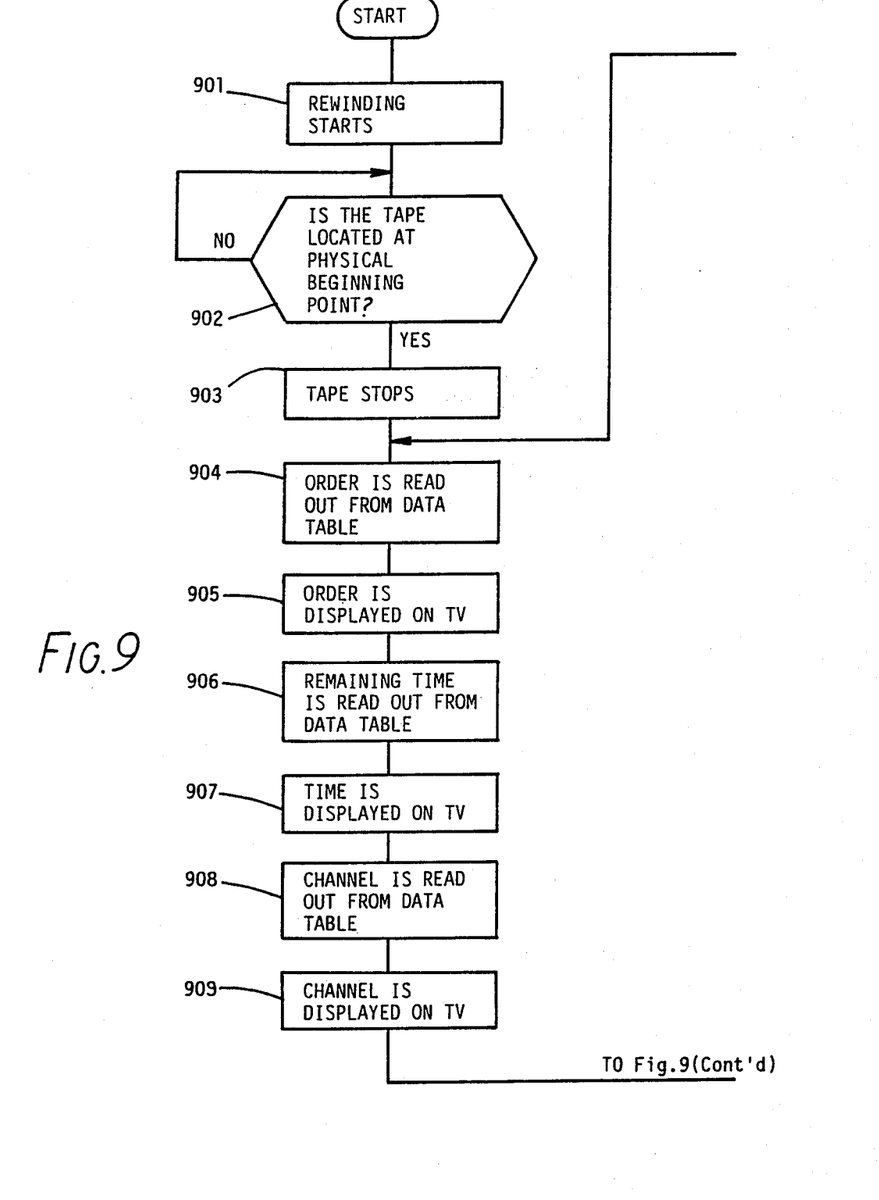
FIG. 9 is a flow chart of computer programming for operating the VCR in accordance with principles of the invention.

An operation of the VCR 4 controlled in accordance with the data transmitted to the data table in the RAM 13 is explained with reference to the flow chart shown in FIG. 9. As above, a user orders play back, and after the data is transmitted to the data table in the RAM, the program shifts to step 901, and rewinding of the video tape is started. This operation is operated by a contact (not shown in the drawings) of a switch for rewinding the VCR 4 that is short-circuited by a switching transistor (not shown in the drawings) in accordance with a command from the cpu 1 through the interface board 18.

When the video tape is rewound to the physical beginning point, the value of the tape counter is set to "0000". Alternately, pulses form a revolution sensor (not shown in the drawings) connected to a reel for the video tape (not shown in the drawings) terminate to indicate the video tape has stopped.

When the program detects either condition, the program shifts to step 903, and stops running the video tape. A terminal of the stop key on the VCR 4 is short-circuited through a switching transistor. It is not necessary to rewind the tape to the physical beginning point, because reference between the value of tape counter and value of tape position in the RAM is accurate.

In step 904 and step 905, the program reads out the first order from the data table, and displays the command at the corner on the TV 5 by the command function set in the personal computer 1.

The remaining time for watching and the channel are displayed on the TV 5, and so forth. (steps 906–909).

In step 910, the program reads out the starting position from the data table ( 100—a value of tape counter) on the tape of the requested TV program. In steps 911, 912, 913 and 914, the program decides whether a video tape is played back or wound or forwarded from the present position or not. In the above example, the starting position of the program which should be played back first in the condition where a video tape stops at the beginning point, is a value of 100 shown on the tape counter, and as a result, the program judges that step 911, step 912, and step 913 are negative and step 914 is affirmative (because "0" is input to the ending position of the last time.)

The program shifts to step 921, and forwarding of the video tape starts. The count value of the tape counter of VCR 4 is incremented from "0" corresponding to forwarding of the video tape at this time. This condition is tested in step 922, and when the value of tape counter on the VCR 4 coincides with the starting point (which means 200 in the above example) of the present TV program, step 922 is affirmative, the program shifts to step 923, and forwarding the video tape stops temporarily.

Next, in step 915, play back starts and is continued until the program is affirmative in step 916. Namely, the ending position on the tape for this program is read out from the data table in step 910 ("200" in the reference numeral 805 in FIG. 8). The tape counter on the VCR 4 is counted up over "100" by play back. When a count in the tape counter reaches to "200", the count coincides with the ending position "200" on the data table. As a result, the program judges affirmative and shifts to step 917.

Figure 8:
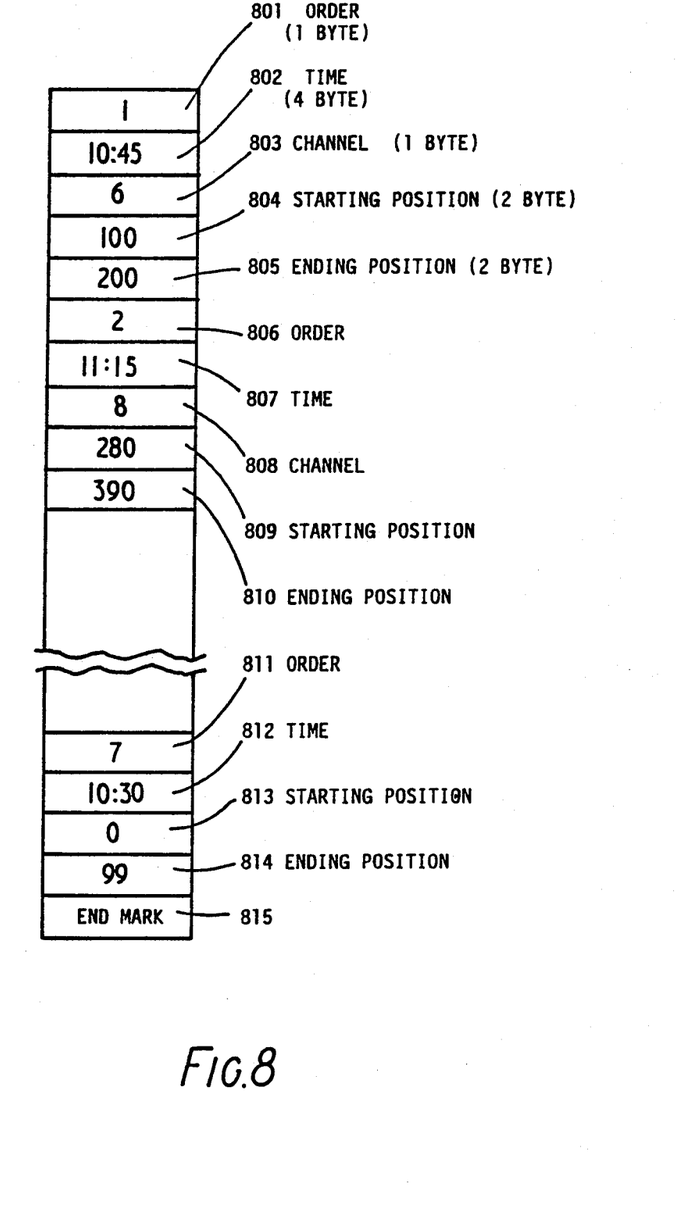
FIG. 8 is a representation of a data table used in the invention.

In step 917, an address on the data table shown in FIG. 8 is incremented (which means increment of an address pointer). The address pointer has stopped in step 805 as is clear from the above explanation. However, the address pointer designates "2" which is the order of step 805 by increment (this operation will be explained later).

In step 918, it is tested whether play back of all the TV programs designating the preferential order is finished or not. With regard to an end mark, it is possible to use a specific symbol or it is possible to judge an end mark by occurrence of no data. In this time, the program is negative because the tape is being played back, and as a result, the program returns to step 904, and reads out "order", "remaining time for watching", "channel", "starting position/ending position of this program" etc. from the data table as the indicated explanation. However, in step 917, the data in relation to "2" of the order in step 806–step 810 shown in FIG. 8 is read out, because the address in the data table is incremented in step 917. The program shifts to step 914 through steps 904–913 like operation for the "order 1".

"Ending position of the last time" in step 914 means "200" in step 805 shown in FIG. 8, and "starting position of this time" means "280" in step 809. Accordingly, the program is affirmative in step 914, and forwards the video tape in step 921. The program starts to play back the TV program of "order 2", when the value of the tape counter on the VCR 4 coincides with "280" of the starting position when the value of the tape counter on the VCR reaches "280" in step 922.

The starting position of the program of the last order "7" described in FIG. 8 as an example is "0", and a TV program has been recorded from the physical beginning point of the video tape. Accordingly, when this TV program is played back, the program is affirmative in step 913, rewinding of the video tape starts in step 920 and play back of the TV program starts through step 923 and step 915.

When this TV program is continuous with the last TV program, the program is affirmative in step 912, and keeps playing back without rewinding or forwarding the video tape.

When the TV program that preferential order "1" has designated starts from the beginning point of the video tape, the program is affirmative in step 911, and as a result, the TV program starts to play back from the beginning point of the video tape at once.

In this embodiment, the cursor key on the key board is used for changing the preferential order, but this invention is not so limited. It is possible to use a mouse or a touch panel which is attached on the surface of the CRT display etc. by changing the program corresponding to preference of use.

In this embodiment, the video tape is rewound to the physical beginning point before the program plays back the TV programs recorded in accordance with the preferential order, with the value of the tape counter coinciding with the tape positions in the memory. However, recently, technology which reads out the present tape position by an angle of gyration between a rolling reel and a supplying reel, and a method of computation by moving the tape a few centimeters, has been applied to practical use. Even if the tape becomes displaced from the VCR, it is not necessary to return the tape to the physical beginning point at the start as in the above explanation by using this technology. As a result, the times to play back the recorded TV programs can be saved.

When the recorded video tape is desired to be kept, data is added to the information and the information is stored on the disk, and also the data is written down on the label of the video tape. After several days, the information is searched by the data, and is displayed on the CRT display 3, preferential order is designated within the information as occasion demands, and it is possible to play back the video tape with the data in that preferential order.

After returning home, recorded information is displayed by the user on the CRT display 3. If a TV program which has not been recorded yet exists, it is possible to keep the recording condition active and to play back records later.

As the above explanation shows, in this invention, a user establishes a time given after returning home and designates a preferential order of TV programs which should be watched within the specific time, and it is possible to control the VCR in accordance with the above operation. This contrasts with conventional systems which enable the user to designate the order only before going outside. As a result, practical use of this kind of system is made more effective by the invention.

What is claimed is:

1. A VCR control system, comprising
means for storing a list of television programs which were recorded in accordance with an individual program table of a user during a predetermined time period;
means for displaying the list of television programs to the user;
means for changing the order of playback of recorded programs to a new order different from the order displayed; and
means for automatically rewinding and fast forwarding the VCR to play back the recorded programs in the new order whereby if the user does not have sufficient time to watch all recorded programs, he or she can play back selected recorded programs in the new order.

2. A VCR control system, according to claim 1, including means for selecting among a rewinding, a fast forwarding and a prompt playback mode, in accordance with the change of order of playback by said changing means.

3. A VCR control system, according to claim 1, wherein said order changing means comprises a cursor key.

4. A VCR control system, according to claim 3, wherein said order changing means comprises a mouse.

5. A VCR control system, according to claim 3, wherein said order changing means comprises a touch panel.

6. A VCR control system, according to claim 1, including means for displaying status information indicating that a designated TV program is partially recorded or is completely recorded, or that nothing is recorded.

7. A VCR control system, comprising:
a display means;
computer means including an input means for receiving commands from a user, and programmed means for
(a) storing a list of television programs which were recorded in accordance with an individual program title of a user;
(b) displaying the list of television programs on said display means;
(c) in response to a command applied to said input means by the user, changing the order of playback of recorded television programs to a new order different from the order displayed; and
(d) controlling rewinding and fast forwarding of said VCR to play back said recorded programs in said new order.

8. The system of claim 7, wherein said display means comprises a CRT.

9. The system of claim 8, wherein said input means comprises a mouse having an output visible on a screen of the CRT.

10. The system of claim 8, wherein said input means comprises a touch panel on a screen of a CRT.

11. The system of claim 7, including a further display means for displaying a status of a television program to be recorded.

12. The system of claim 7, wherein said input means comprises a cursor key of a keyboard.

13. A method of controlling a VCR, comprising the steps of:
recording a sequence of programs in accordance with an individual program table of a user;
storing the list of television programs recorded during a predetermined time period;
displaying the list of recorded television programs to the user;
changing the order of playback of reported programs to a new order selected by the user and different from the order displayed; and
automatically rewinding or fast forwarding the VCR as necessary to play back the recorded programs in the new order;
whereby if the user does not have sufficient time to watch all the recorded programs, he or she can play back selected recorded programs in the new order.

* * * * *